(12) United States Patent
Ciappa

(10) Patent No.: US 12,319,040 B2
(45) Date of Patent: Jun. 3, 2025

(54) FLEX AND TORSION WATER SPORTS BOARD

(71) Applicant: Marcelo Bofarull Ciappa, Santiago (CL)

(72) Inventor: Marcelo Bofarull Ciappa, Santiago (CL)

( * ) Notice: Subject to any disclaimer, the term of this patent is extended or adjusted under 35 U.S.C. 154(b) by 217 days.

(21) Appl. No.: 17/988,938

(22) Filed: Feb. 2, 2023

(65) Prior Publication Data
US 2024/0262466 A1 Aug. 8, 2024

(51) Int. Cl.
| | |
|---|---|
| *B32B 3/10* | (2006.01) |
| *B32B 5/18* | (2006.01) |
| *B32B 27/30* | (2006.01) |
| *B32B 27/34* | (2006.01) |
| *B63B 32/40* | (2020.01) |
| *B63B 32/57* | (2020.01) |

(52) U.S. Cl.
CPC ............... *B32B 3/10* (2013.01); *B32B 5/18* (2013.01); *B32B 27/306* (2013.01); *B32B 27/34* (2013.01); *B63B 32/45* (2020.02); *B63B 32/57* (2020.02); *B32B 2305/022* (2013.01); *B32B 2307/51* (2013.01); *B32B 2307/544* (2013.01); *B32B 2307/546* (2013.01); *B32B 2307/718* (2013.01); *B32B 2307/7265* (2013.01)

(58) Field of Classification Search
None
See application file for complete search history.

(56) References Cited

U.S. PATENT DOCUMENTS

| | | | | |
|---|---|---|---|---|
| 5,514,017 | A | * | 5/1996 | Chimiak ............... B63B 32/57 428/116 |
| 2009/0011667 | A1 | * | 1/2009 | Hayward ............... B63B 32/57 441/74 |
| 2016/0193793 | A1 | * | 7/2016 | Filippini ............ B29D 99/0014 264/138 |
| 2018/0141624 | A1 | * | 5/2018 | Schroenn ............... B63B 32/20 |

FOREIGN PATENT DOCUMENTS

EP 783429 B1 * 12/2000 ......... B63B 35/7909

* cited by examiner

*Primary Examiner* — Chinessa T. Golden
(74) *Attorney, Agent, or Firm* — Bay State IP, LLC

(57) ABSTRACT

An improved water sports board, which is composed of a structural element at the base, an intermediate layer of deformable and waterproof elastic foam, in the upper area pressure plates, and inside structural columns. The structural element is light and has high resistance. Thickness of the structural element and their reinforcements can be modified and calibrated without restriction, achieving great flexion and torsion characteristics. The elastic middle layer allows to maintain the required volume and improves the dampening properties. The pressure plates receive the pressure of the surfer feet and transfer this pressure through the structural columns to the structural element. The intermediate elastic layer, pressure plates and structural columns do not affect board flexion or torsion

20 Claims, 8 Drawing Sheets

FLEX AND TORSION WATER SPORTS BOARD

BACKGROUND OF THE INVENTION

Field of the Invention

The present invention relates to water sports boards, including surf boards, windsurf boards, kitesurf boards, and stand-up paddle boards.

More particularly, this invention describes water sports boards with an improved construction that allows flex and torsion to be modified for better performance.

Description of the Related Art

The classic and most massive construction of surfboards has remained unchanged for more than 7 decades, since the inclusion of the polyurethane (PU) foam board, externally reinforced with fiberglass and polyester resin, and with a central wooden stringer (1958).

The advantages of this type of construction are:
1) Good overall performance
2) Manufacturing speed
3) Availability of materials
4) Easy to change designs
5) Reasonable costs
6) Ease of repair And the disadvantages:
1) Fragility (especially competition boards)
2) Flexion and torsion cannot be easily modified
3) Early material fatigue occurs, the elastic memory is gradually lost, and the board loses its ability to respond quickly
4) Dents or depressions occur in the upper part of the board due to pressure with the feet, deteriorating the board and making it impossible to use
5) High contamination of the construction process Other similar construction methods have been developed with alternative materials such as expanded polystyrene foams, extruded polystyrene foams, the use of epoxy resins, alternative stringer systems such as parabolic stringers, carbon fibre stringers, or other composite stringers and reinforcements. Construction methods have also been developed without the use of interior foams, leaving the interior hollow, with or without reinforcing ribs and stringers.

It is widely accepted that a board with good flex and torsion provides better performance. This is explained because the board, when properly deformed, moves in the water more efficiently, with less turbulence, which implies less loss of kinetic energy. In addition, by having better flexing and torsion properties, the board extracts more kinetic energy from the movement of the wave, accelerating more quickly without losing speed.

Most high-performance surfboards are still made of polyurethane foam, and fiberglass with a wood stringer. With this construction good flexibility, good torsion, and low weight are achieved, so boards perform with greater speed, better maneuverability, and better control. Competition surfboards are manufactured specifically for each competitor. Each athlete has their own "shaper" who develops their specific models and measurements. These boards are made with light fiberglass reinforcement to achieve the desired high flexibility and low weight, but they have the drawback of being very fragile, sometimes they only last few sessions.

An important feature of high-performance surfboards is that the size of the board is associated with the level of the surfer. As the surfer improves his level, he can use smaller and thinner boards, which drastically increases the flexibility of the board. The flexibility depends on the thickness, and it is inverse quadratic function, if the thickness is reduced by half, the flexibility increases four times. In this way, a beginner or medium level surfer, who requires a greater volume, will always be limited to using more rigid boards and therefore with less performance.

There are also other less massive types of construction on the market, among which the so-called "softops" surfboards, which are mainly aimed at beginners. These boards are constructed with a stiff inner element and a softer outer layer. The goal of these tables is to facilitate the learning process while minimizing damage when hitting the board.

The advantages of these tables are as follows
1) Low cost
2) Soft surface that makes them safer for the surfer
3) Ease of use The disadvantages of soft tops
1) Poor performance
2) Repair difficulty In the specific case of windsurf boards, and due to the intense forces, such as the landing of large jumps, the "sandwich" type construction has been preferred. Internal light expanded polystyrene foam is encapsulated with structural shell consisting of a sandwich of glass or carbon fabrics and a core of low thickness (typically 3 to 6 mm) of high-density foam, usually polyvinyl chloride foam. With this construction, high structural strength and low weight are achieved, but with the inconvenience of having very little flexibility and torsion capacity.

SUMMARY OF THE INVENTION

The present invention consists of a construction method for general use boards and for high performance boards, which:

1) Allows flexibility, torsion, and damping to be precisely defined and calibrated for each specific design, increasing efficiency and performance.
2) Improves structural strength
3) Allows to build boards for beginners and intermediates with the flexibility and twist of a competition board
4) Increases resistance in the pressure areas of the deck
5) Increases resistance to fatigue
6) It is more friendly to the environment The constructive solution consists of four main parts:
1) STRUCTURAL ELEMENT
2) INTERMEDIATE ELASTIC FOAM
3) PRESSURE PLATES
4) STRUCTURAL COLUMNS Structural Element In addition to buoyancy, it is the element that supports the hydrodynamic loads and the surfer's feet loads. The structural element, when deformed, gives the board the characteristics of bending and torsion.

The most important feature from the point of view of the invention is that the geometry of the structural element can be varied, specifically thickness distribution. This variations in geometry, together with the distribution of fabrics and structural reinforcements, allows high-precision flexion and torsion design and calibration.

The structural reinforcements of the structural element are glass fabrics, carbon fibres, in an epoxy resin matrix. Sandwich structures can also be used to increase the surface stiffness of the laminates.

One of the advantages of the structural element of the invention is that by having less thickness than a board built with traditional methods, allows greater mechanical resistance to breakage since the fabrics and reinforcements are located closer to the neutral fibre (Euler-Bernoulli beam theory). As the reinforcements are closer to the neutral fibre, the amount of these reinforcements can be increased, maintaining flexion, and minimizing the possibility of failure.

The fins, which are what give stability to the board, are anchored to the structural element. The most typical configuration of the structural element is a light rigid foam core, covered by fabrics and structural reinforcements. Inner rigid foam can be expanded polystyrene, extruded polystyrene, polyvinyl chloride foam, polymethacrylimide foam. Other alternative constructions can be the hollow construction system with or without ribs inside, or resin sealed wood construction.

Intermediate Elastic Foam

Located over the structural element, it provides flotation and dampening.

The great feature of this foam is that it does not affect the bending/torsion of the structural element. When the board flexes or twists, the elastic layer deforms freely and does not oppose relevant resistance forces for bending/torsion.

Intermediate elastic foam has high levels of dampening, a superior dampening behaviour is achieved compared to the traditional construction. The dampening contribution of the intermediate elastic foam allows to improve the dynamic behaviour of the board when passing through irregular areas on the water surface, improving control.

Intermediate elastic foam is a closed cell elastic foam that does not absorb water. It could be ethylene vinyl acetate foam, polyether block amide foam, or others with similar characteristics.

Pressure Plates

These plates receive the loads from the surfer's feet and transmit them to the structural element, since the intermediate elastic foam, does not support the pressure of the feet and deforms.

The pressure of the surfer's feet must be transmitted directly and without delay since these loads are the ones that act on the board and modify its trajectory, often with almost instantaneous pressure changes.

Pressure plates transfer the load to the structural element through the intermediate elastic foam layer in two ways:
1) In high pressure areas, that is, where the feet are placed when making the most intense manoeuvres (bottom turns, top turns), the plates transmit the pressure directly through structural columns.
2) In areas of lower pressure (foot transition areas) the plate rests directly on the intermediate elastic foam increasing the contact surface and distributing the pressure over a larger area These plates are adhered to the upper surface of the intermediate elastic foam and form a pattern of pieces separated from each other. This separation allows the elastic intermediate layer to deform freely and not affect the bending and torsion of the structural element.

The separation between plates is what absorbs the geometric changes of the top surface of the board when it bends or twists.

Pressure plates are thin, are made of fiberglass, carbon fibre, or thin sandwich plates. An important characteristic of pressure plates is that they are highly rigid and resistant and do not lose their characteristics with use.

The plates, due to their great structural capacity, can also be used to install accessories, for example, foot straps, mast bases in case of windsurf boards, or other accessories that are required.

Structural Columns

The structural columns allow the pressure of the feet to be transferred to the structural element located at the base of the board.

The structural columns are distributed in such a way that they support the pressure plates, like the columns of a bridge, where the pressure plates function as beams and slabs.

These columns, being separated from each other, do not affect the bending or torsion of the board, since that separation space, being occupied by the intermediate elastic foam, deforms freely.

Structural columns are made of foams with high resistance to compression, such as Polyvinyl Chloride Foam, Polymethacrylimide foam, or others with similar characteristics. Alternatively, they can be made of monolithic materials, or sandwich solutions, with a geometry that allows the load to be transferred from the pressure plates to the structural element.

The pressure columns can have a circular, square, rectangular, or mixed section.

Figure 1:
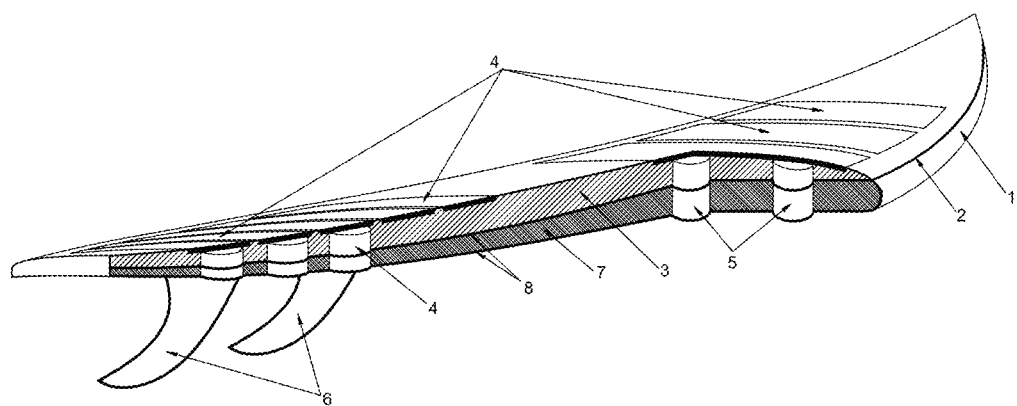
FIG. 1 Isometric image of the invention, with partial longitudinal section
FIG. 2 Top view of the board
FIG. 3 Side view of the board
FIG. 4 Top view of the board without pressure plates
FIG. 5A Section A-A according to FIG. 2
FIG. 5B Section B-B according to FIG. 2
FIG. 5C Section C-C according to FIG. 2
FIG. 5D Section D-D according to FIG. 2
FIG. 5E Section E-E according to FIG. 2
FIG. 6A Diagram of simply supported structural element
FIG. 6B Diagram of structural element in deflection with load F
FIG. 7A Diagram of complete section of the invention simply supported
FIG. 7B Full section diagram of the invention in deflection with load F
FIG. 8A Top view of the board without pressure plates or columns
FIG. 8B Section F-F according to FIG. 8A with a thinner structural element in the tail
FIG. 8C Section F-F according to FIG. 8A with a thinner structural element at the tip
FIG. 8D Section F-F according to FIG. 8A with partial intermediate elastic foam at the tip
FIG. 8E Section F-F according to FIG. 8A with partial intermediate elastic foam on the tail
FIG. 9A Top view of the board with intermediate elastic foams of different dampening capacity
FIG. 9B Section G-G of FIG. 9A
FIG. 10 Top view of board with alternative geometry pressure plates
FIG. 11 Typical section, with soft foam covering layer
FIG. 12 Typical section, with curved upper surface of the structural element
FIG. 13 Typical section, with anchor for accessories

REFERENCE NUMBERS ON DRAWINGS 1 structural element
2 joint surface 3 intermediate elastic foam
4 pressure plates
5 structural columns
6 fins
7 internal rigid foam
8 structural laminate
9 deflection
10 gap between pressure plates
11 type A dampening foam
12 type B dampening foam
13 type C dampening foam
14 junction line between elastic foams
15 type D dampening foam
16 soft surface covering layer
17 curved top section of the structural element
18 anchor
19 fixing bolt

DETAILED DESCRIPTION OF THE PREFERRED EMBODIMENTS

FIG. 1 shows an isometric board view with a partial section, this figure shows the parts of the invention. The structural element 1, which is composed of the internal rigid foam 7, and the structural laminate 8. The upper surface of the structural element 1 is adhered to the lower surface of the intermediate elastic foam 3. This joining area corresponds to the joint surface 2. Pressure plates 4 are observed over the elastic intermediate foam. Also shown are the structural columns 5 and the fins 6, the fins 6 are attached to the structural element 1 with the same methods used in traditional board construction.

The structural element 1, in the bottom and in the edges, has the same geometry as a board built by traditional methods, however, in the upper part, it has the joint surface 2 that can be modified, if the joint surface 2 changes, the volume gained or lost by the structural element 1, will be replaced by the same volume of the intermediate elastic foam 3, maintaining the original volume. The geometry of the joint surface 2 can be freely varied according to the required design. This variation of the joint surface 2 implies that the thicknesses distribution of the structural element 1 can also be freely modified. The changes in the geometry of the structural element 1, derived from the changes in the joint surface 2, together with the distribution of structural reinforcements of the structural laminate 8, allows the flexion and torsion to be calibrated precisely and without restrictions. The internal rigid foam 7 can be expanded polystyrene, extruded polystyrene, polyvinyl chloride foam, or other similar foam. The structural laminate 8 is made of composite material, and can be fiberglass laminate, carbon laminate, or sandwich with low-thickness interior light foam, like traditional construction. The intermediate elastic foam 3 can be made of ethylene vinyl acetate foam, polyether block amide foam, or others with similar characteristics. The pressure plates 4 can be laminated fiberglass, laminated carbon fiber, or sandwich with a low-thickness interior light foam. The structural columns 5 are made of rigid foam and can have different geometries and sections. They can be made of polyvinyl chloride foam, Polymethacrylimide foam or similar foam. Or can be made of monolithic or composite sections.

In FIG. 1 the structural element 1 is shown for reference with a configuration of internal rigid foam 7 covered by a layer of high resistance structural laminate 8. However, the structural element 1 can be built with other traditional methods, or combinations of these methods. It can have vertical wood cores, vertical stringers of rigid foam with high mechanical resistance, or stringers of composite material. The structural element can also be hollow with structural sandwich skins and can be combined with internal beams and structural ribs.

Figure 2:
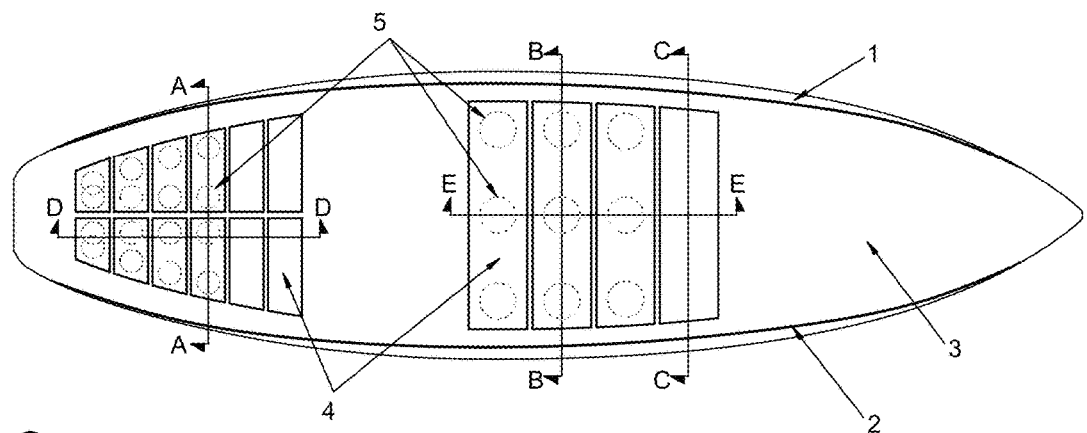

FIG. 2 shows a top view of the board in a typical configuration with pressure plates 4 with straight edges for reference. In the image the pressure plates 4 are observed, the structural columns 5 are also observed in segmented lines, because they are under the plates. What is shown in the drawing is the configuration with two groups of pressure plates 4, a group in the rear or tail of the board, and a group of pressure plates 4 in the central area. The group in the back is to receive the pressure from the rear foot, and the group of plates in the central area to receive the pressure from the front foot of the surfer. The pressure plates that do not have support columns are in transition areas, that is, those areas of little use and little pressure. The areas with pressure columns 5 are the ones subjected to the greatest pressure, that is, the areas where the feet are located to make the hardest turns and manoeuvres.

Figure 3:
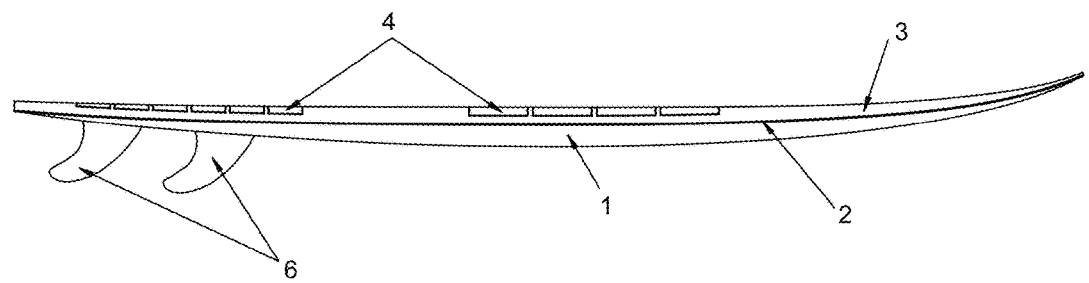

FIG. 3 shows a side view of the board with the different parts, the structural element 1, the joint surface 2, which is shown as a line, the intermediate elastic foam 3, the pressure plates 4, and fins 6, located at the rear of the board, commonly known as the tail.

Figure 4:
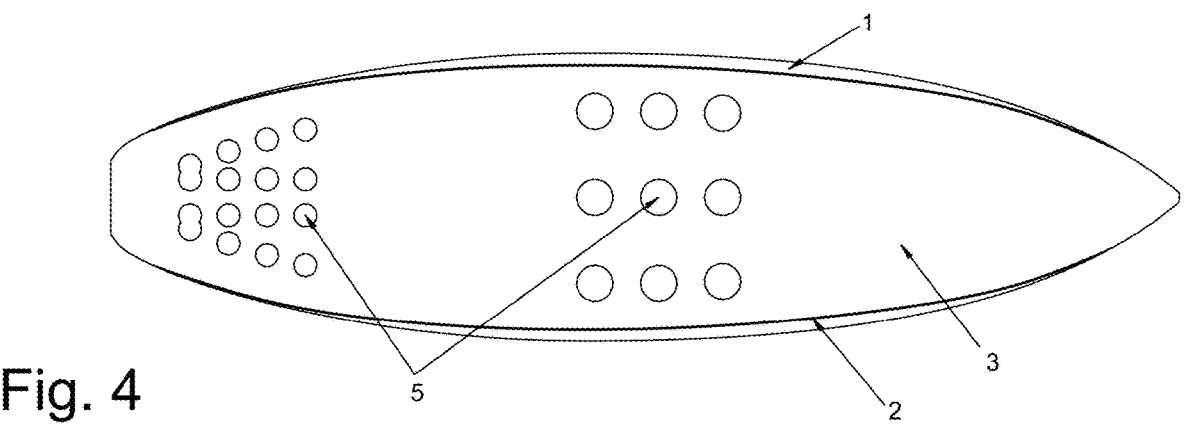

FIG. 4 shows a top view of the board like FIG. 2, but without the pressure plates. This figure shows a typical configuration of the pressure columns 5 with a circular section. The columns in this case have a cylindrical geometry. It is also observed, in a similar way to that indicated in FIG. 3, a group for the rear foot and another central group for the front foot. The structural columns indicated in this case are cylindrical, columns can also have other geometries, they can have a square, rectangular section, or combinations of the previous.

Figure 5A:
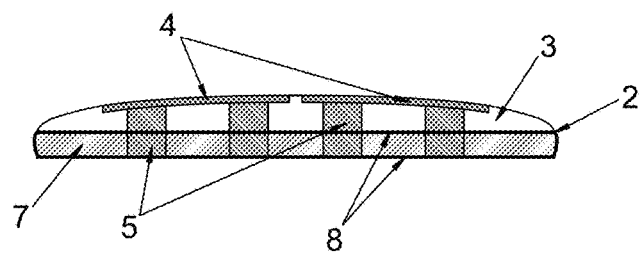

FIG. 5A shows the cross-section A-A of FIG. 1. In this cross-section the pressure plates 4 and the structural columns 5 can be seen. In this figure the structural columns 5 joins the pressure plates 4 with the structural element 1, but in addition to this the columns occupy the entire space between the pressure plates 4 and the bottom skin of the structural element 1. To achieve the above, the construction process must consider the installation of the columns inside the structural element prior to the process of lamination of the structural laminate 8. The pressure columns 5, by occupying all the available space, including the space inside the structural element, increase the capacity of structural resistance to vertical pressures.

It is also noted as an alternative that the pressure plates have a gap in the middle; this allows even greater deformation and mobility in the transverse axis.

Figure 5B:
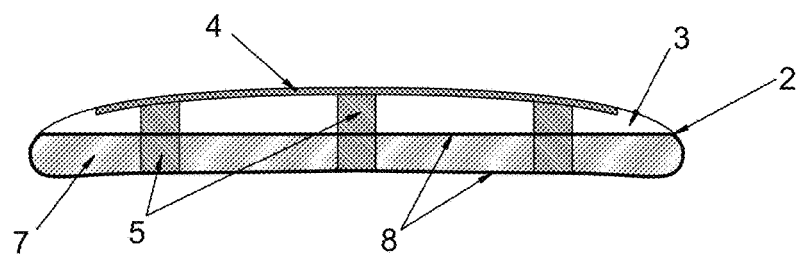
Figure 5C:
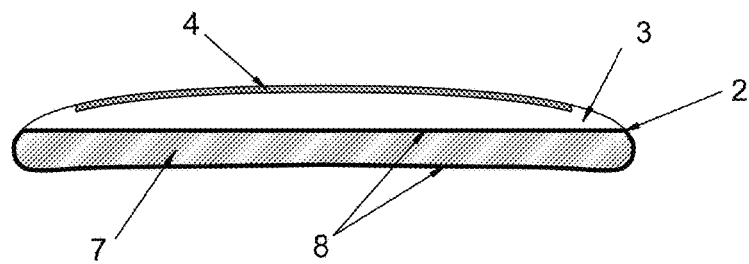

FIG. 5B. shows cross-section B-B of FIG. 1, shows features like those indicated in FIG. 5A, also corresponds to a high-pressure zone except that the pressure plate, alternatively, has no intermediate divisions FIG. 5C. shows the cross-section C-C of FIG. 1 shows the typical section of a low-pressure zone, in which the use of columns is not necessary. In this case the pressure plate 4 is supported only by the intermediate elastic foam 3

Figure 5D:
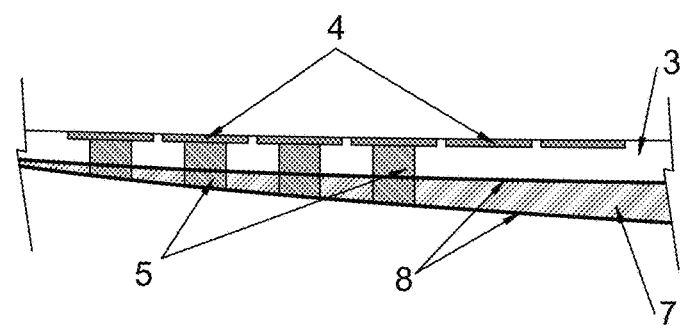

FIG. 5D. shows the longitudinal section D-D of FIG. 1, in this section it shows a section of the tail of the board, in this section the two types of plates are observed, those with pressure columns at the left and those without pressure columns at right of the figure.

Figure 5E:
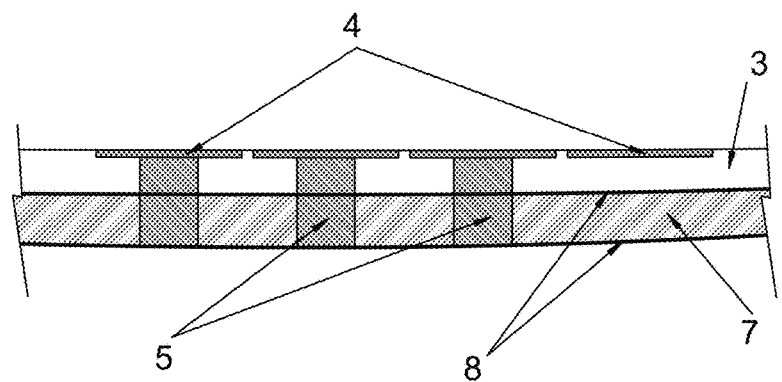

FIG. 5E. shows the longitudinal section E-E of FIG. 1, in this section it shows a section of the central area of the board, in this section the two types of plates are observed, those with pressure columns at the left and those without pressure columns at right of the figure.

FIGS. 6A, 6B, 7A, 7B. Shows the conceptual functioning of the invention. The concept of a beam simply supported at two points with a single central load, is taken as a basis. In the images it can be seen how the invention allows the beam with intermediate elastic foam 3 and therefore of greater thickness, deforms in the same way as a beam without elastic foam, when receiving the same load.

In the case of alternative constructions of the structural element 1, the effect is identical to that showed in FIGS. 6A,6B,7A,7B.

Figure 6A:
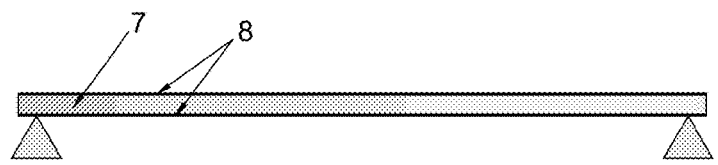

FIG. 6A. Shows a simply supported structural beam, this beam is a section of structural element 1, and is composed of internal rigid foam 7 and structural laminate 8.

Figure 6B:
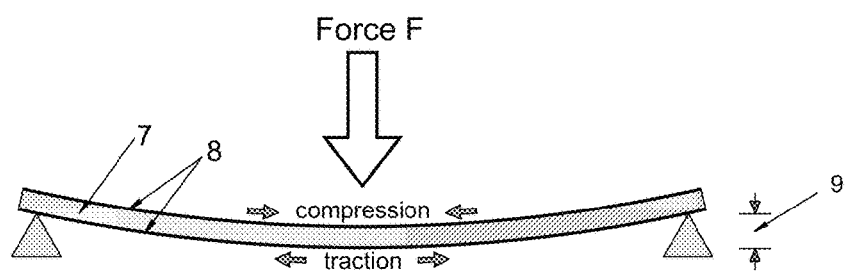

FIG. 6B. It shows the same beam indicated in FIG. 6A, to which a load of magnitude F is applied. When the beam deforms, a vertical magnitude indicated as deflection 9 is obtained. The lower layer of the beam is under tension, so it tends to stretch, and the upper layer is under compression, so it tends to shorten.

Figure 7A:
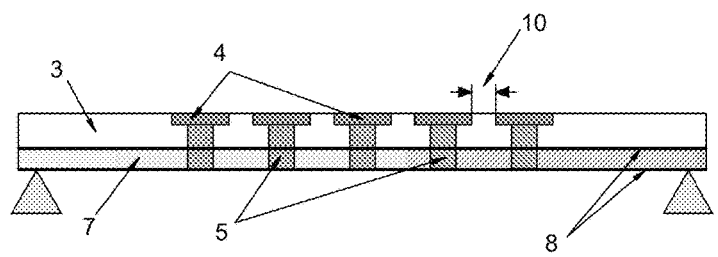

FIG. 7A. It shows a complete section of the invention, which includes: the structural element 1, the intermediate elastic foam 3, the pressure plates 4, and the structural columns 5. In this figure, the gap between pressure plates 10 can be seen as a reference.

Figure 7B:
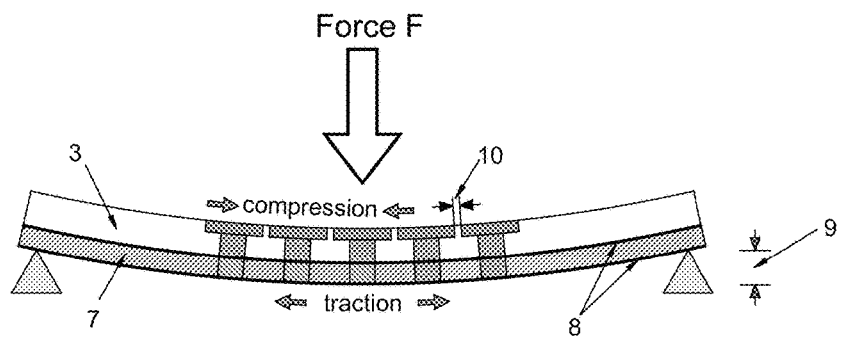

FIG. 7B. It shows the same beam indicated in FIG. 7A to which the same load of magnitude F indicated in FIG. 6B is applied. In this figure, the deflection 9 is identical to the deflection 9 indicated in FIG. 6B. It can also be seen that the gap between pressure plates 10 is shorter than that shown in the gap between pressure plates 10 of FIG. 7A, this is due to the fact that the gap between pressure plates 10 shortens and absorbs the surface deformation due to compression. In addition to the surface compression, the intermediate elastic foam 3 is also compressed in the entire area under the pressure plates 4, without offering resistance. The resistance to bending deformation is only produced by structural element 1.

In the case of beams subjected to bending that do not have the structural columns 5, the effect is identical.

Figure 8A:
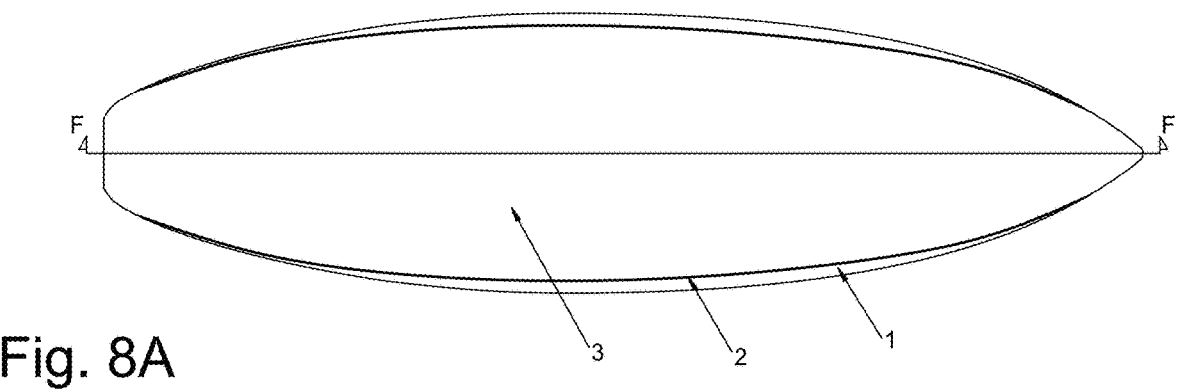

FIG. 8A. Shows a top view of the board without plates or columns, showing the F-F section axis.

Figure 8B:
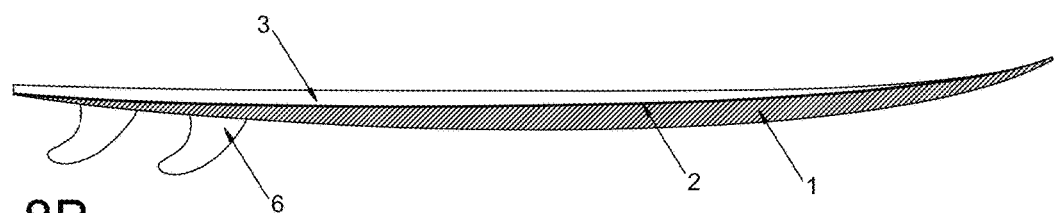

FIG. 8B. It shows a view according to the F-F section of FIG. 8A, where the thickness distribution is less in the rear area of the board, with which the flexibility is greater in that area.

Figure 8C:
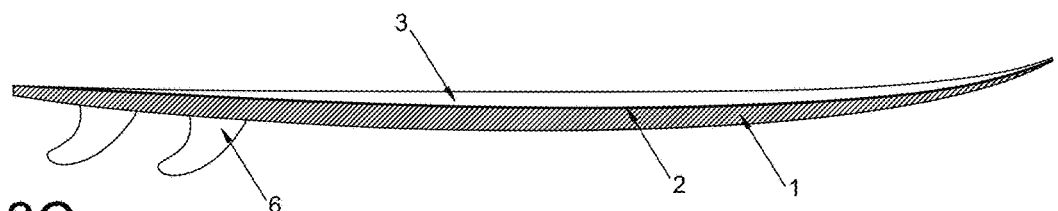

FIG. 8C. It shows a view according to the F-F section of FIG. 8A, where the thickness distribution is less in the front area of the board, with which the flexibility is greater in that area.

FIGS. 8B and 8C graphically show the effect of varying the thickness of the structural element 1, which defines the areas of greatest flexibility of the board.

Figure 8D:
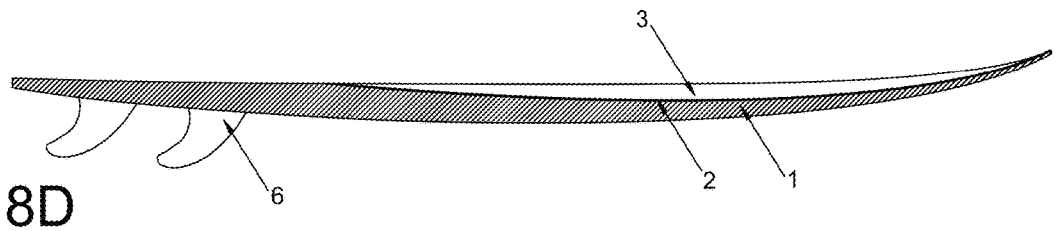

FIG. 8D. It shows a view according to the section F-F of FIG. 8A, where the elastic foam occupies a partial area at the tip of the board.

Figure 8E:
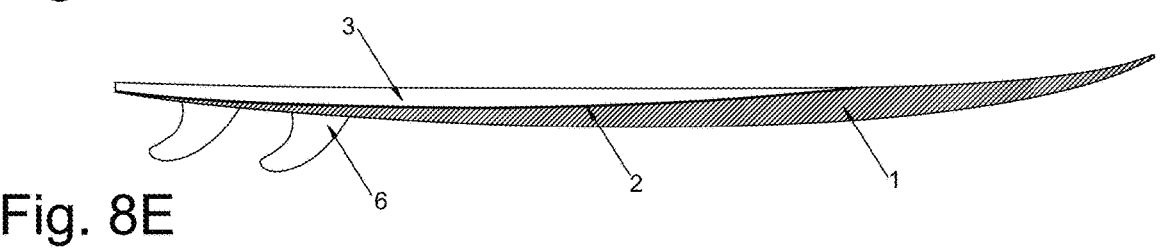

FIG. 8E. It shows a view according to the section F-F of FIG. 8A, where the elastic foam occupies a partial area in the tail of the board.

The distribution alternatives of the Intermediate elastic foam indicated in FIGS. 8B,8C,8D and 8E, can also be combined with each other.

Figure 9A:
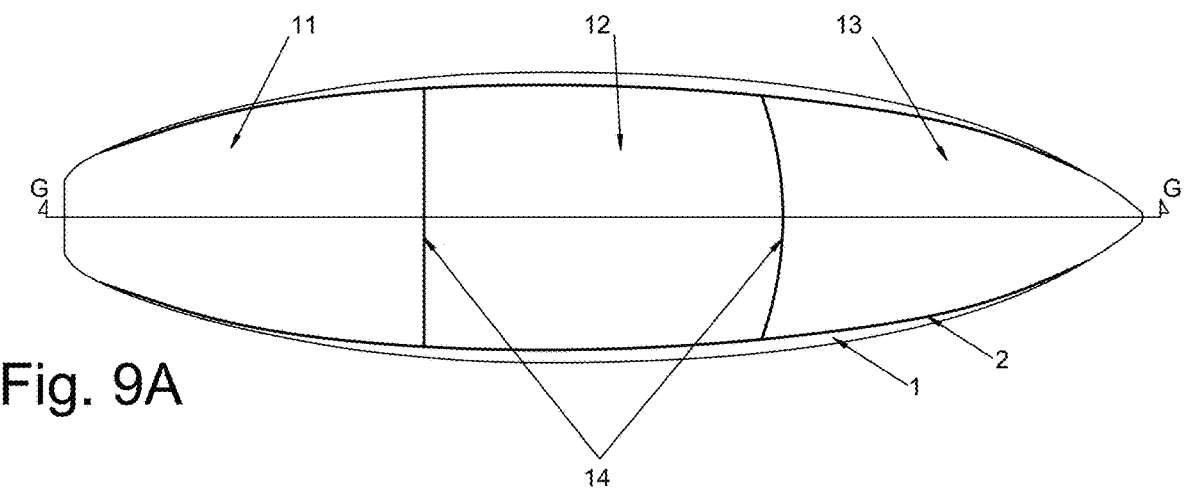

FIG. 9A. Shows a board top view without plates or columns, this figure shows an alternative solution of combined elastic foams that have different damping capacities. Foam with dampening type A, 11, foam with dampening type B, 12, Foam with dampening type C, 13. The line of union between elastic foams 14 is also shown. These foams have different dampening capacities and when be combined they reach better overall dampening capacity. The separation lines can vary in location, shape, and quantity, as well as the quantity of different elastic foams, to obtain the required dampening result.

Figure 9B:
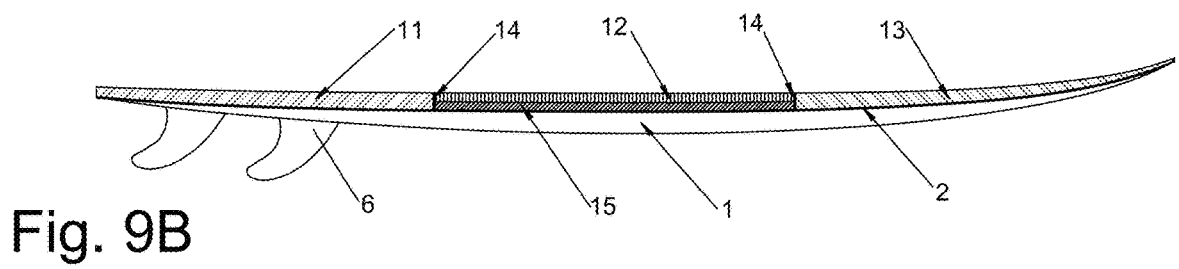

FIG. 9B. It shows a side view according to section G-G of FIG. 10A, the foam with type A dampening, 11, the foam with type B dampening, 12, the foam with type C dampening, 13, is also shown. The line of union between elastic foams 14. In addition, this figure shows the type D dampening foam, 19, located under other dampening layer in an alternative way.

Figure 10:
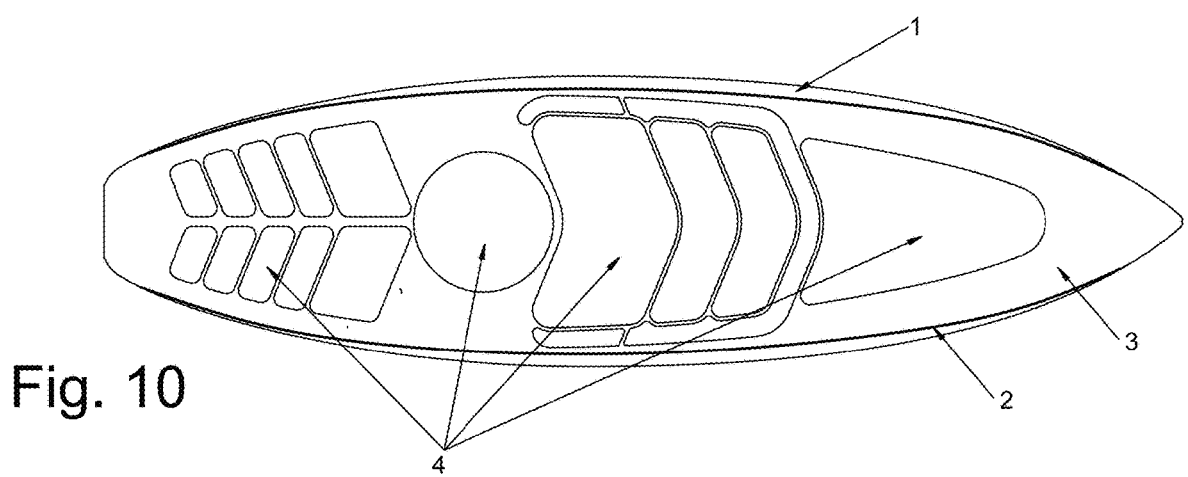

FIG. 10. Shows a top view of the board with alternative pressure plates 4 to those shown in FIG. 2. The pressure plates can have straight, curved edges, or combinations of both. The pressure plates can have different sizes, they can be separated with different spacing, although the minimum spacing between plates must be 2 mm. The plates can be oriented symmetrically with respect to the axis of the board, or they can be located asymmetrically. The pressure plate edges may be oriented parallel, orthogonal, or at an angle to the board axis.

Figure 11:
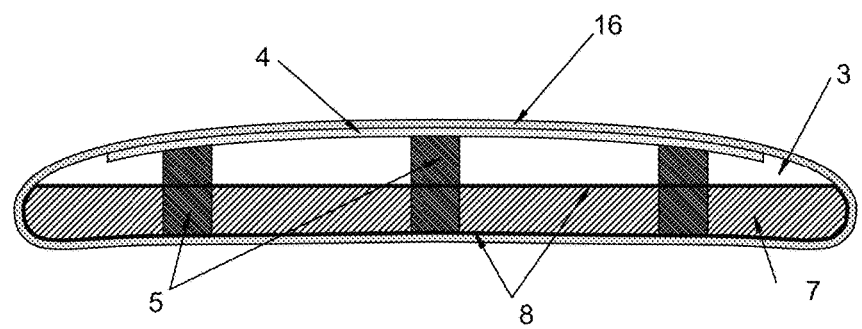

FIG. 11. Shows a reference section such as section B-B in FIG. 2. The soft surface covering layer 16 surrounds the section and allows the board to be transformed into a soft top, with improved flexion and torsion.

Figure 12:
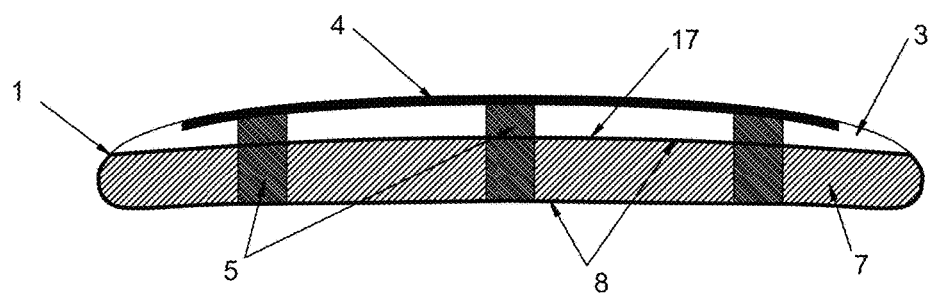
Figure 13:
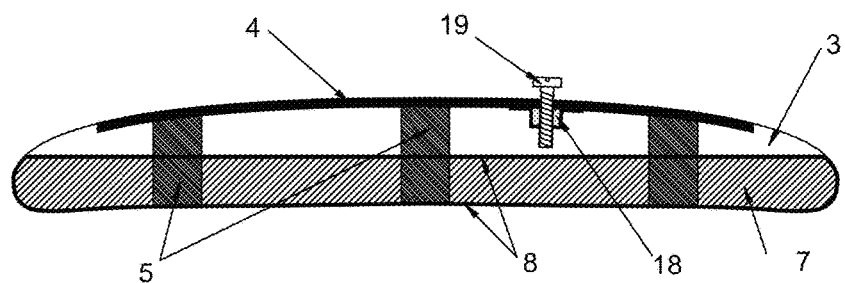

FIG. 12. Shows a reference section as section B-B of FIG. 2 and shows an alternative geometry for the curved top section of the structural element 17, this curve can vary transversally and longitudinally, to adapt the best possible geometry for the required bending and torsion. FIG. 13. Shows a reference section like the section B-B of FIG. 2 in which the anchor 18 is shown, adhered to the pressure plate 4, and the fixing bolt 19. This anchor allows the attachment of accessories. The anchor configuration can have different options: to anchor foot straps, windsurf mast bases, or other accessories or fixings that are required.

What is claimed is:
1. A water sports board comprising:
a structural element at the base of the board, with variable thickness, which partially contributes to the external shape of the board and allows flexion and torsion in the longitudinal and transverse axis to be calibrated;
a layer of intermediate elastic foam, deformable, and waterproof, adhered to the top of the structural element and this layer partially contributes to the external shape of the board, it allows to calibrate the dampening capacity of the board and this layer does not influence the flexion and torsion of the board;
a plurality of two-tiered columns located in the layer of intermediate elastic foam and further comprising; and
a first set of two-tiered columns arranged in rows at a tail of the water sports board, and
a second set of two-tiered columns arranged in rows at a central area of the water sports board,
a plurality of pressure plates that are adhered to a joint surface over the first set of two-tiered columns and are adhered to the joint surface over the second set of two-tiered columns,
wherein each pressure plate lays flat on the joint surface and is located above a corresponding row of two-tiered columns.

2. A water sports board, according to claim 1, where a surface between the structural element and the intermediate elastic foam has a variable geometry.

3. A water sports board, according to claim 1 where the intermediate elastic foam layer is selected from ethylene vinyl acetate foam, crosslinked polyether block amide foam, or another foam with similar characteristics.

4. A water sports board, according to claim 1 where the intermediate elastic foam layer is selected from one or more options with different dampening characteristics.

5. A water sports board, according to claim 1 where the intermediate elastic foam layer has joints between different foams, the joints are chosen from curved, straight, vertical, horizontal, angled, or combinations of the previous alternatives.

6. A water sports board, according to claim 1 where the pressure plates are chosen from: fiberglass/resin laminate monolithic plates, carbon fibre/resin laminate monolithic plates, fiberglass/resin plates with high-resistance foam core, carbon fibre/resin plates with high-resistance foam core, or combinations of the previous alternatives.

7. A water sports board, according to claim 1 where the pressure plates are distributed on the top of the intermediate elastic foam separated from each other with at least 2 mm between them.

8. A water sports board, according to claim 1 where the pressure plates are chosen from plates with straight edges, curved edges, different sizes, symmetrical respect to the axis of the board, asymmetrical respect to the axis of the board, or combinations of the previous alternatives.

9. A water sports board, according to claim 1 where the pressure plates are chosen to be supported by internal columns, not supported by internal columns, or combinations of the previous alternatives.

10. A water sports board, according to claim 1 where the pressure plates have inserts for anchoring foot straps, windsurfing mast bases, or other accessories.

11. A water sports board, according to claim 1 where the plurality of two-tiered columns are chosen from crosslinked polyvinyl chloride foam, polymethacrylimide foam, other similar rigid foam, monolithic construction, composite material, or combinations of the previous alternatives.

12. A water sports board, according to claim 1 where the plurality of two-tiered columns are chosen from circular section, square section, rectangular section, or combinations of the previous alternatives.

13. A water sports board, according to claim 1 where the plurality of two-tiered columns occupy the entire space between the pressure plates and a lower layer of composite material of the structural element.

14. A water sports board, according to claim 1 where the entire board is covered by a flexible elastic layer that eliminates hard surfaces.

15. A water sports board, according to claim 1 where a tip of the water sports board is covered by a flexible elastic layer that eliminates hard surfaces.

16. A water sports board, according to claim 1 where the tail of the water sports board is covered by a flexible elastic layer that eliminates hard surfaces.

17. A water sports board, according to claim 1 where the central area of the water sports board is covered by a flexible elastic layer that eliminates hard surfaces.

18. A water sports board, according to claim 1 where the layer of intermediate elastic foam is located over the structural element at a tip of the water sports board.

19. A water sports board, according to claim 1 where the layer of intermediate elastic foam is located over the structural element at the tail of the water sports board.

20. A water sports board, according to claim 1 where the layer of intermediate elastic foam is located over the structural element at the central area of the water sports board.

* * * * *